June 15, 1926.

L. J. HUGUES

STEERING COLUMN LOCK

Filed Sept. 25, 1925

WITNESS:

Louis J. Hugues,
INVENTOR

BY Victor J. Evans
ATTORNEY

June 15, 1926.

L. J. HUGUES 1,589,169

STEERING COLUMN LOCK

Filed Sept. 25, 1925      2 Sheets-Sheet 2

Louis J. Hugues, INVENTOR

BY Victor J. Evans
ATTORNEY

WITNESS:

Patented June 15, 1926.

1,589,169

UNITED STATES PATENT OFFICE.

LOUIS J. HUGUES, OF TOPEKA, KANSAS.

STEERING-COLUMN LOCK.

Application filed September 25, 1925. Serial No. 58,630.

This invention relates to a lock for the steering column of a motor vehicle, the general object of the invention being to provide a combination lock for locking the column against movement, with means for changing the combination whenever desired and with means for fastening the lock to a part of the automobile.

Another object of the invention is to provide spring means for holding the bolt in retracted position, cam means for projecting the bolt and a second spring for projecting the bolt when the column has been moved to a certain position after the cam means have compressed the first spring.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1:
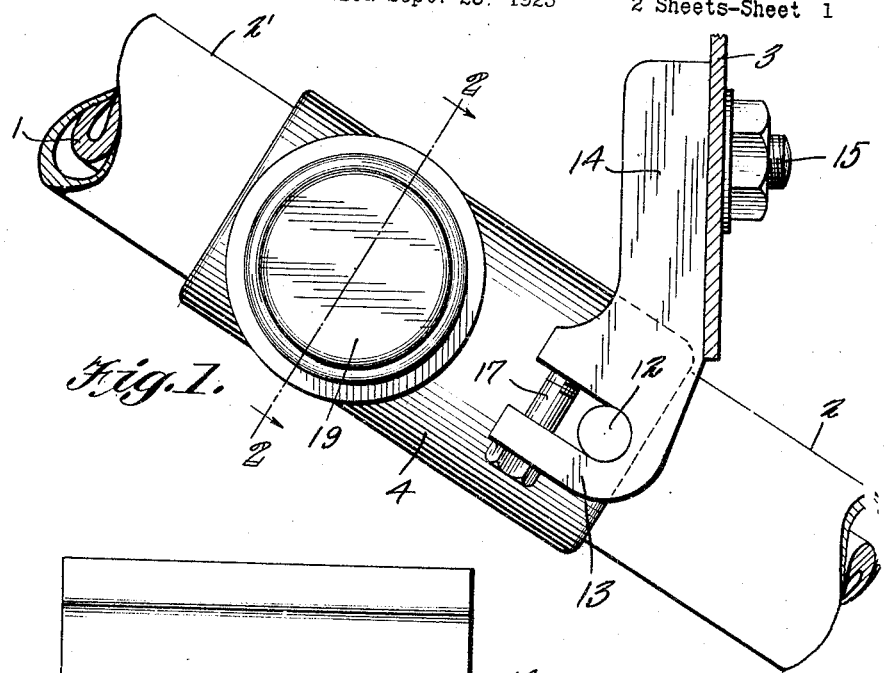
Figure 1 is a view showing a portion of the steering column and its housing, a portion of the dash and the exterior parts of the invention.

In these views, 1 indicates a portion of the steering column, 2 and 2' the housing thereof and 3 indicates the dash of the vehicle.

In carrying out my invention, I cut a section from the housing and substitute for the cut portion, the lock casing 4 which has its ends recessed to receive the ends of the housing where it has been cut, and a sleeve 5 is fastened to the column 2 by the screw 6 which is covered by a ring 7 surrounding the sleeve and placed between the sleeve and the casing. The sleeve is provided with the keeper notches 8 in one end for receiving the locking bolt. An annular groove 9 is formed adjacent the lower end of the casing for receiving a key 10 formed on the sleeve and a keyway 11 is formed in the casing and communicates with the groove so that the casing can be removed from the sleeve by rotating the parts to bring the key 10 in alignment with the keyway 11 and then sliding the casing off the sleeve. Then by removing the ring 7 and the screw 6, the sleeve can be removed from the column. When the bolt of the lock is in engagement with one of the keeper notches, the parts cannot be moved and thus the lock cannot be taken off the column. The lower end of the casing is provided with the projections 12 which are engaged by the forked ends 13 of the bracket 14 which is connected by the bolts 15 to the dash 3. Pins 16 prevent movement of the bolts in the holes in the brackets. The prongs of the forks are clamped on the projections 6 by the bolts 17.

Figure 2:
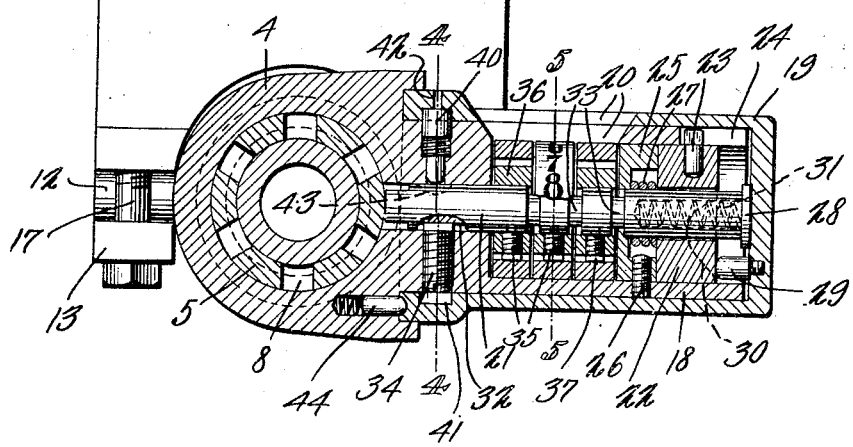
Figure 2 is a section on line 2—2 of Figure 1.
Figure 3:
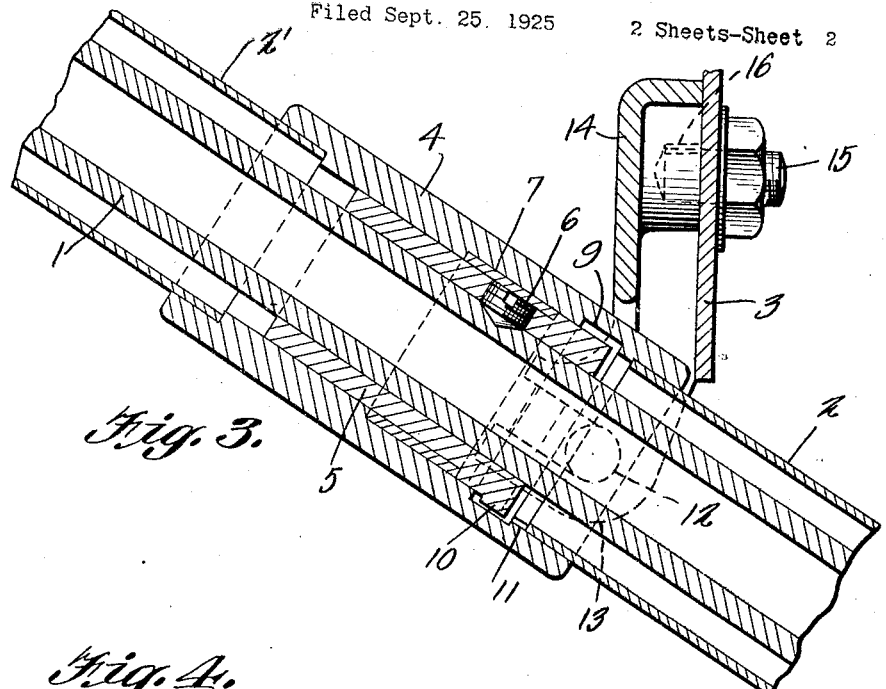
Figure 3 is a vertical sectional view through Figure 1.
Figures 4, 5:
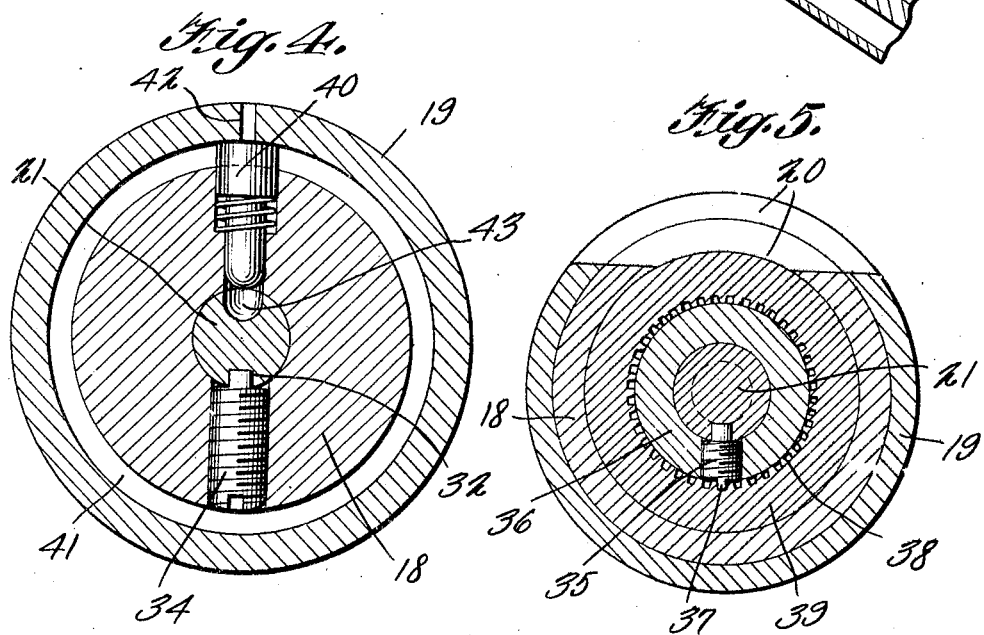
Figure 4 is a section on line 4—4 of Figure 2.
Figure 5 is a section on line 5—5 of Figure 2.

An extension 18 projects at right angles from the casing 4 and a barrel 19 is rotatably mounted on the extension. The extension and the barrel are provided with the windows 20 so that the combination rings can be seen. The locking bolt 21 passes through the bore of the extension and has its flat inner end arranged to engage the keeper notches 8 in the sleeve. A block 22 is slidably arranged on the outer end of the bolt and is also slidably arranged in the outer end of the extension. The block is held against rotary movement by means of a pin 23 thereon engaging a slot 24 in the extension. A partition 25 is arranged in the extension and is fastened thereto by the screw 26. A spring 27 is arranged on the bolt between the partition and the block and tends to hold the bolt in retracted position by forcing the block against the head 28 of the bolt. A cam 29 is carried by the outer end of the barrel and engages the block which has a recess 30 therein so that when the cam is opposite the recess the spring 27 will force the lock against the end of the barrel and thus hold the bolt in retracted position, but when the cam rides out of the recess, during the rotation of the barrel, it will force the block inwardly and thus the spring will be contracted and then a spring 31 in the outer end of the bolt and engaging the end of the barrel will project the bolt if the sleeve 5 is in a position where one of its notches 8 is in alignment with the bolt. If the sleeve is not in this position, the parts will remain as shown in Figure 2, with the bolt retracted, but as soon as the steering mechanism is moved to bring a notch 8 opposite the bolt, the bolt will be projected by the spring 31 and thus the steering mechanism will be locked against movement. When the barrel is turned to place the cam 29 opposite the recess 30, the spring 27 will act to retract the bolt.

The bolt is formed with the longitudinally extending groove 32 and a number of annular grooves 33. The flat end of a bolt 34 engages the groove 32 to prevent rotary movement of the bolt and the reduced ends of the set screws 35, each of which is carried by a combination ring 36, also engages the groove 32 and the grooves 33. Each set screw 35 is provided with a projection 37 on its outer end for engaging any one of a plurality of teeth 38 on an outer ring 39 which has engraved on its outer circumference the combination numbers or characters, as shown in Figure 2. Thus each combination ring has adjustably connected therewith an engraved ring so that the combinations can be changed whenever desired. As will be seen, when the inner ends of the screws 35 are engaging the annular grooves 33, the rings can be rotated, but the bolt cannot be moved until the screws 35 are all brought to a position where their inner ends will engage the grooves 32. Then the bolt can be retracted as the parts are so positioned that the screws 35 cannot engage the annular grooves 33 until the bolt is in projected position.

A spring plunger 40 is carried by the inner part of the extension 18 and has its head engaging a groove 41 in the inner part of the barrel so as to prevent removal of the barrel until the bolt is in retracted position. Then by passing a small pointed instrument through a hole 42 in the barrel and pressing the inner end of the plunger into a recess 43 in the extension, the barrel can be removed from the extension. When in projected position, the recess 43 will be out of alignment with the plunger, so that the plunger cannot be forced inwardly to remove it from the recess 41 and thus the barrel will remain locked to the extension. A small plunger 44 is arranged in the lock casing and engages a recess in the end of the barrel to facilitate the proper positioning of the barrel on the extension.

From the foregoing, it will be seen that I have produced a simple and effective combination lock for locking the steering mechanism of a vehicle against movement, so that the vehicle can be locked against use by an unauthorized person. The combinations can be changed whenever desired, as it is simply necessary to change the position of the engraved rings 39 on the combination rings 36. The lock can be set by turning the barrel, but it will not lock the column until the column itself is turned to a certain extent. The bolts for holding the device in place are all covered by portions of the lock and such portions cannot be moved while the bolt is in projected position.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A lock of the class described, comprising a cylindrical part, a barrel rotatably mounted thereon, a bolt in the cylindrical part, a member slidably mounted on the same, and arranged to engage the head of the bolt, a spring for propelling the member against the head to hold the bolt in retracted position, said member having a recess therein, a cam on the barrel for engaging the member and its recess to move the same to contract the spring or permit the spring to expand, a second spring of less strength than the first for projecting the bolt and combination means for controlling the movement of the bolt.

In testimony whereof I affix my signature.

LOUIS J. HUGUES.